United States Patent
Gillin

(10) Patent No.: US 10,546,300 B2
(45) Date of Patent: Jan. 28, 2020

(54) METHOD FOR ACTIVATING A NEW SERVICE OR ACCOUNT

(75) Inventor: Matthew J. Gillin, Villanova, PA (US)

(73) Assignee: Relay Holdings, LLC, Radnor, PA (US)

(*) Notice: Subject to any disclaimer, the term of this patent is extended or adjusted under 35 U.S.C. 154(b) by 1494 days.

(21) Appl. No.: 12/831,486

(22) Filed: Jul. 7, 2010

(65) Prior Publication Data

US 2012/0010992 A1 Jan. 12, 2012

(51) Int. Cl.
*G06Q 30/00* (2012.01)

(52) U.S. Cl.
CPC ................... *G06Q 30/00* (2013.01)

(58) Field of Classification Search
CPC .................................... G06Q 30/02
USPC .............. 705/14.49, 10, 14.4; 707/10; 379/142.05, 142.04
See application file for complete search history.

(56) References Cited

U.S. PATENT DOCUMENTS

| | | | |
|---|---|---|---|
| 6,014,561 A | 1/2000 | Mölne | |
| 6,341,724 B2 | 1/2002 | Campisano | |
| 7,533,814 B2 | 5/2009 | Martinez | |
| 7,650,314 B1* | 1/2010 | Saunders | 705/64 |
| 2005/0135579 A1 | 6/2005 | Creamer et al. | |
| 2008/0033784 A1* | 2/2008 | Chalimadugu et al. | 705/10 |
| 2009/0026255 A1* | 1/2009 | Besecker et al. | 235/375 |
| 2009/0192928 A1* | 7/2009 | Abifaker | 705/35 |
| 2011/0026699 A1* | 2/2011 | Amir et al. | 379/142.05 |

OTHER PUBLICATIONS

"SMS Prepaid PIN Activation and Payment Solution," www.freelancer.com/.../SMS-Prepaid-PIN-Activ . . . , accessed May 19, 2010, 3 pages.

Digital Insight, "How Text Message Banking Works," www.diproductsite.com/demo/how.html, accessed May 19, 2010, 1 page.

* cited by examiner

*Primary Examiner* — Sun M Li
(74) *Attorney, Agent, or Firm* — Schwegman Lundberg & Woessner, P.A.

(57) ABSTRACT

Business would like to electronically communicate with a customer but may not have the resources to actively acquire the customer's phone number. To passively acquire and link a customer's phone number to the customer's account, a unique code may be created for each customer. A proxy code for the unique code may also be created. The proxy code may be sent to the customer with an invitation to open a new account, receive a new service, or renew a service by returning the proxy code by phone call or text message. The proxy code may then be received from the customer by phone call or text message. The phone number from which the phone call or text message has been received may be authenticated. The phone number may then be linked to the unique code based on the proxy code.

30 Claims, 3 Drawing Sheets

METHOD FOR ACTIVATING A NEW SERVICE OR ACCOUNT

TECHNICAL FIELD

The present disclosure relates to an electronic communication system and method and, more particularly, to a system and method of passively acquiring a customer's phone number and linking the customer's phone number to the customer's account without requesting the customer to actively provide customer identifying information

BACKGROUND

Many businesses would like to communicate with their customers electronically but are unable to do so because they do not have electronic contact information for their customers. For example, a utility company may wish to send bills to its customers via e-mail or text message; however, the utility company is unable to do so because it does not have e-mail addresses or cell phone numbers for its customers. Because these businesses are unable to communicate with their customers electronically, these businesses are forced to communicate with their customers via more costly and inefficient channels, such as by mail.

To address this issue some businesses have attempted to gather electronic contact information for their customers by allowing their customers to create electronic accounts, by contacting their customers to request electronic contact information, or by requiring their customers to provide electronic contact information. Unfortunately, such efforts may require a lot of time and money and may not produce the desired results. Furthermore, such efforts require active participation of customers who may not have an incentive to provide the requested electronic contact information.

SUMMARY

Disclosed herein are systems and methods of passively acquiring an customer's phone number and linking the customer's phone number to the customer's account without requesting the customer to actively provide customer identifying information. This may be done, for example, to provide a business with electronic contact information, such as a cell phone number, for a customer.

In one example embodiment, to passively acquire and link a customer's phone number, a unique code may be created for each customer. A proxy code for the unique code may also be created. The proxy code may be sent to the customer with an invitation to open a new account, receive a new service, or renew a service by returning the proxy code by phone call or text message. The proxy code may then be received from the customer by phone call or text message. The phone number from which the phone call or text message has been received may be authenticated. The phone number may then be linked to the unique code based on the proxy code.

In another example embodiment, to passively acquire and link customers' phone number, a plurality of proxy codes may be provided to a company for inclusion in a marketing campaign to the customers. The marketing campaign may include an invitation to open a new account, receive a new service, or renew a service by returning a proxy code provided with the invitation by phone call or text message. The proxy code may then be received from a customer by phone call or text message. The phone number from which the phone call or text message has been received may then be authenticated. A unique code may be created for each proxy code that corresponds with an authenticated phone number. The unique code may then be linked to the authenticated phone number.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION OF ILLUSTRATIVE EMBODIMENTS

A detailed description of illustrative embodiments of the present invention will now be described with reference to FIGS. 1-3. Although this description provides a detailed example of possible implementations of the present invention, it should be noted that these details are intended to be exemplary and in no way delimit the scope of the invention.

Companies would like to electronically communicate with their customer as electronic communication may be cheaper and more efficient. However, the biggest obstacle for electronic communication is that businesses often do not have the cell phone numbers of their customers. Some businesses have attempted to gather electronic contact information for their customers by allowing their customers to create electronic accounts, by contacting their customers to request electronic contact information, or by requiring their customers to provide electronic contact information. Unfortunately, such efforts may require a lot of time and money and may not produce the desired results. Furthermore, such efforts require active participation of customers who may not have an incentive to provide the requested electronic contact information.

Disclosed herein are systems and methods of passively acquiring an customer's phone number and linking the customer's phone number to the customer's account without requesting the customer to actively provide customer identifying information. This may be done, for example, to provide a business with electronic contact information, such as a cell phone number, for a customer.

Figure 1:
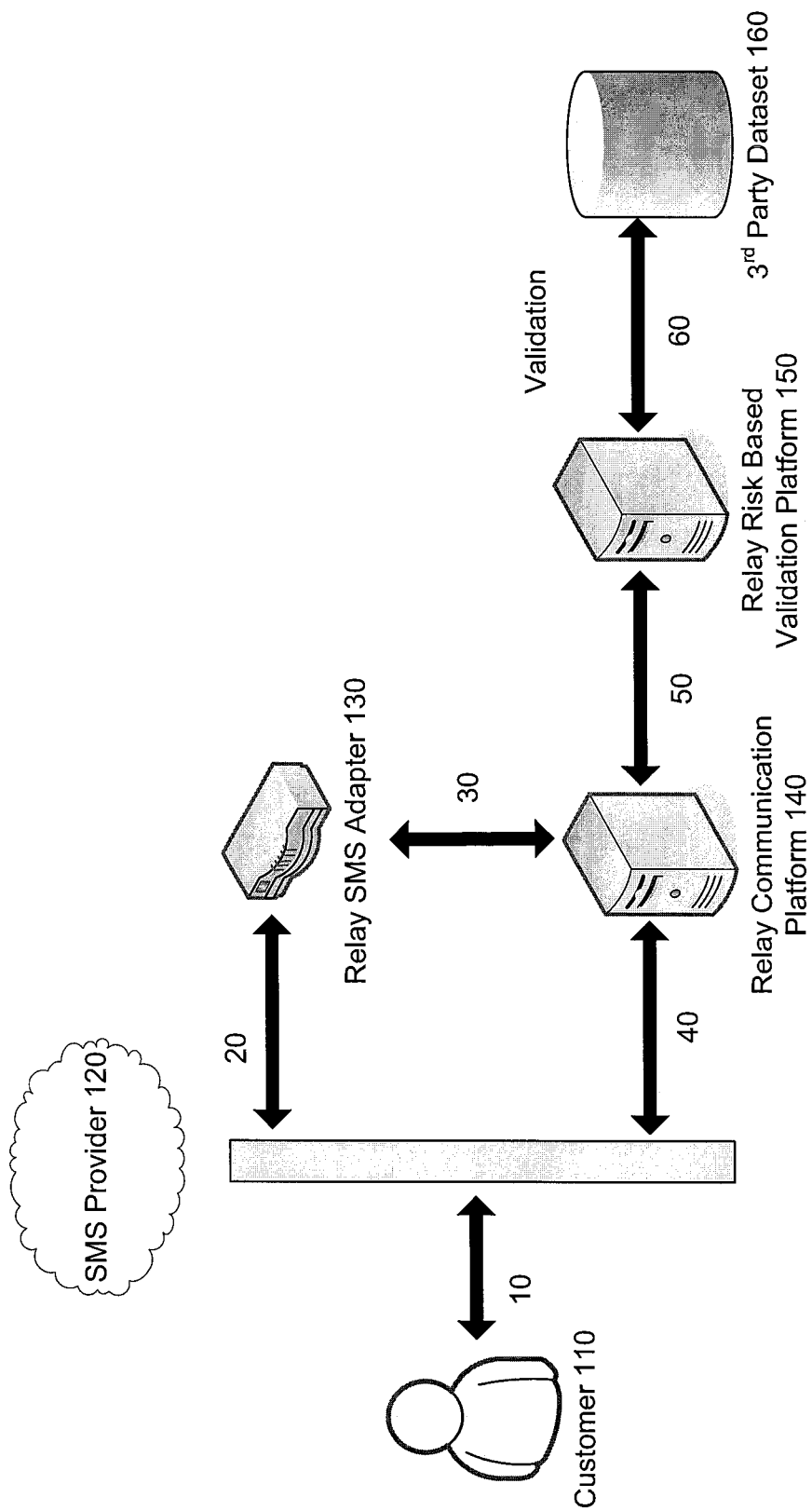
FIG. 1 illustrates an example embodiment of a system for passively acquiring a customer's phone number and linking the customer's phone number to the customer's account without requesting the customer to actively provide customer identifying information.

FIG. 1 illustrates an example embodiment of a system for passively acquiring a customer's phone number and linking the customer's phone number to the customer's account without requesting the customer to actively provide customer identifying information. This may be done, for example, to passively acquire the phone number of a customer when the customer activates a new account, such as a credit card; activates a new service, such as electronic billing; or renews a service, such as renewing a subscription.

As shown in FIG. 1, the system 100 may include relay communication platform 140. Relay communication platform 140 may be a computer, a mainframe, a server, or the like. According to an example embodiment, relay communication platform 140 may include hardware components and/or software components such that relay communication platform 140 may be used to execute applications such as internet applications, operating systems, server applications, client applicants, database applications, or the like. For example, relay communication platform 140 may be used to execute software that may passively acquire a customer's phone number and link that customer's phone number to the customer's account without requesting the customer to actively provide customer identifying information.

In an example embodiment, relay communication platform 140 may further include a processor that may be in operative communication with a memory component. The processor may include a standardized processor, a specialized processor, a microprocessor, or the like. The processor may execute instructions including, for example, instructions for creating a unique code for each customer, creating a proxy code for the unique code, or any other suitable instruction, which will be described in more detail below.

Relay communication platform 140 may further include a memory component that may store the instructions that may be executed by the processor. The memory component may include a tangible computer readable storage medium in the form of volatile and/or nonvolatile memory such as random access memory (RAM), read only memory (ROM, cache, flash memory, a hard disk, or any other suitable storage component. In one embodiment, the memory component may be a separate component in communication with relay communication platform 140. According to another embodiment, the memory component may be integrated into the processor.

As shown in FIG. 1, relay communication platform 140 may be in communication with Short Message Service (SMS) provider 120, relay SMS adapter 130, and relay risk based validation platform 150 via communication links 30, 40, and/or 50. Communications link 30, 40, and/or 50 may be a wired connection including, for example, a USB connection, a Firewire connection, an Ethernet connection, or the like and/or a wireless connection such as wireless 802.11n connection, a radio connection, a cell phone connection, or the like.

Relay communication platform 140 may enable a business to passively acquire an existing customer's phone number and link the customer's phone number to the customer's account without requesting the customer to actively provide customer identifying information. For example, relay communication platform 140 may enable a business, such as a utility company, to passively acquire a phone number for customer 110 and link the phone number for customer 110 to an account for customer 110 without requesting customer 110 to actively provide identifying information. The business may be a transaction partner, such as a corporation that has significant customer transactions; a communication partner, such as a corporation that may have incomplete electronic contact information; or a data partner, such as a company that has data that may be used to enhance an address profile. Customer 110 may be an existing customer of a business, such as a customer of a cell phone provider, an internet provider, a cable television provider, a utility company, a bank, or the like.

To passively acquire a customer's phone number and link that customer's phone number to the customer's account without requesting the customer to actively provide customer identifying information, relay communication platform 140 may create a unique code for each customer that belongs to a business. In one example embodiment, the unique code may be an account identifier, such as an account number, a credit number, an alphanumeric code, or the like. In another example embodiment, the unique code may be an arbitrary code that would allow the business to identify a customer, but would not allow any other entity or person to identify the customer. For example, the unique code may be a partial account number, a partial credit number, a ten digital code, an alphanumeric code, an encrypted code or the like.

Relay communication platform 140 may also create a proxy code for each unique code. This may be done, for example, to enable a customer to activate a new account, activate a new service, or to renew a service by transmitting the proxy code to relay communication platform 140 by phone call or text message. The proxy code may be a code that allows information to be uniquely identified while keeping the data anonymous. For example, the proxy code may be a code generated based on a fingerprinting algorithm that may allow the customer 110 to activate a new account and/or a new service without revealing the identity of customer 110.

The proxy code may be sent to the customer along with an invitation to open a new account, receive a new service, or renew a service. When the customer of the business receives the invitation, the customer may elect to open a new account or to receive a new service by returning the proxy code by phone call or text message to relay communication platform 140.

In one example embodiment, customer 110 may transmit the proxy code to relay communication platform 140 through SMS provider 120. For example, customer 110 may transmit a text message via communication link 10 to SMS provider 120 where the text message may then transmitted to relay communication platform 140 via communication link 40. Communications links 10 and/or 40 may be a wired connection including, for example, a USB connection, a Firewire connection, an Ethernet connection, or the like and/or a wireless connection such as wireless 802.11n connection, a radio connection, a cell phone connection, or the like. SMS provider 120 may be a device, or service that offers SMS transit. For example, SMS provider 120 may be a service provider that transforms messages to mobile network traffic from other media, or vice versa. This may be done, for example, to allow the transmission or receipt of SMS messages to and from customer 110.

In another example embodiment, customer 110 may transmit the proxy code to relay communication platform 140 through SMS provider 120 and relay SMS adapter 130. For example, customer 110 may transmit a text message via communication link 10 to SMS provider 120 where the text message may then be transmitted to relay SMS adapter 130 via communication link 20. The message may then be transmitted to relay communication platform 140 via communication link 30. Communications links 10, 20 and/or 30 may be a wired connection including, for example, a USB connection, a Firewire connection, an Ethernet connection, or the like and/or a wireless connection such as wireless 802.11n connection, a radio connection, a cell phone connection, or the like. Relay SMS adapter 130 may be a computer, a mainframe, a server, or the like.

According to an example embodiment, relay communication platform 140 may include hardware components and/or software components such that relay SMS adapter 130 may be used to translate the text message into a different format. This may be done, for example, to translate a text message into a format that may be easily understood by relay communication platform 140. For example, relay communication platform 140 may be in communication with several SMS providers. Each of the SMS providers may use a different format for sending and receiving text messages. To ensure that the text messages are normalized, a relay SMS adapter may translate text messages received from a SMS provider into a standardized format understood by relay communication platform 140. Additionally, relay SMS adapter 130 may be used to ensure that the text messages are transmitted to relay communication platform 140 in a manner that may be more efficient than would be available if transmitted normally through communication link 40. For example, relay SMS adapter 130 may transmit text messages to relay communication platform 140 via an internet connection that may not be available via communication link 40.

When relay communication platform 140 receives the proxy code from the customer, relay communication platform 140 may identify the phone number from which the phone call or text message has been received. Additionally, relay communication platform 140 may retrieve customer information from a plurality of sources using the unique code associated with the proxy code. Relay communication platform 140 may then transmit the identified phone number and/or the proxy code to the relay risk based validation platform 150 to authenticate the identified phone number via communication link 50. Communications link 50 may be a wired connection including, for example, a USB connection, a Firewire connection, an Ethernet connection, or the like and/or a wireless connection such as wireless 802.11n connection, a radio connection, a cell phone connection, or the like.

According to an example embodiment, relay communication platform 140 may include hardware components and/or software components such that relay risk based validation platform 150 may be used to authenticate a phone number. This may be done, for example, to determine whether the identified phone number from which a phone call or a text message has been received belongs to or is associated with customer 110. For example, relay risk based validation platform 150 may authenticate an identified phone number and/or a proxy code from relay communication platform 140.

In one example embodiment, relay risk based validation platform 150 may authenticate the identified phone number by using the proxy code to retrieve information regarding customer 110 from a plurality of sources, such as third party dataset 160. Upon retrieving information regarding customer 110, relay risk based validation platform 150 may analyze the information to determine one or more determined phone numbers associated with customer 110. Relay risk based validation platform 150 may then compare the one or more determined phone numbers to the identified phone number, the phone number from which a phone call or a text message has been received. When the identified phone number matches at least one or more determined phone numbers for customer 110, relay risk based validation platform 150 may authenticate the identified phone number as belonging to or being associated with customer 110. When the identified phone number does not match at least one or more determined phone numbers for customer 110, relay risk based validation platform 150 may notify relay communication platform 140 that the identified phone number may not be authenticated.

In another example embodiment, relay risk based validation platform 150 may authenticate the identified phone number by matching the identified phone number to a phone number that may be included in a plurality of sources, such as third party dataset 160. When a match for the identified phone number has been discovered, relay risk based validation platform 150 may identify one or more individuals associated with the phone number. Relay risk based validation platform 150 may then use the proxy code to retrieve information regarding customer 110. Relay risk based validation platform 150 may then match the information regarding customer 110 to the one or more individuals associated with the phone number and may authenticate the identified phone number when a match is discovered. When a match is not discovered, relay risk based validation platform 150 may notify relay communication platform 140 that the identified phone number may not be authenticated.

When the phone number has been authenticated, relay communication platform 140 may then link the phone number to the unique code based on the proxy code. When the phone number cannot be authenticated, relay communication platform 140 may send a text message to the customer that instructs the customer to call a phone number to open the new account or to receive the new service.

As shown in FIG. 1, the system 100 may include third party dataset 160. Third party dataset 160 may be a computer, a server, a database, or the like that belongs to a transaction partner, such as a corporation that has significant consumer transactions; a communication partner, such as a corporation that may have incomplete electronic contact information; or a data partner, such as a company that has data that may be used to enhance an address profile. For example, third party dataset 160 may be a motor vehicle database, or a cell phone service provider database. Information included within third party dataset 160 may include may include electronic contact information for the customer 110, such as a cell phone number, an e-mail address, an identity of a software application or the like for the customer 110. Additionally, third party dataset 160 may include demographic information, financial information, consumer information, credit information, personal information, or the like.

Third party dataset 160 may communicate with relay risk based validation platform 150 via communication link 60. Communication link 60 may be a wired connection including, for example, a USB connection, a Firewire connection, an Ethernet connection, or the like and/or a wireless connection such as wireless 802.11n connection, a radio connection, a cell phone connection, or the like.

Figure 2:
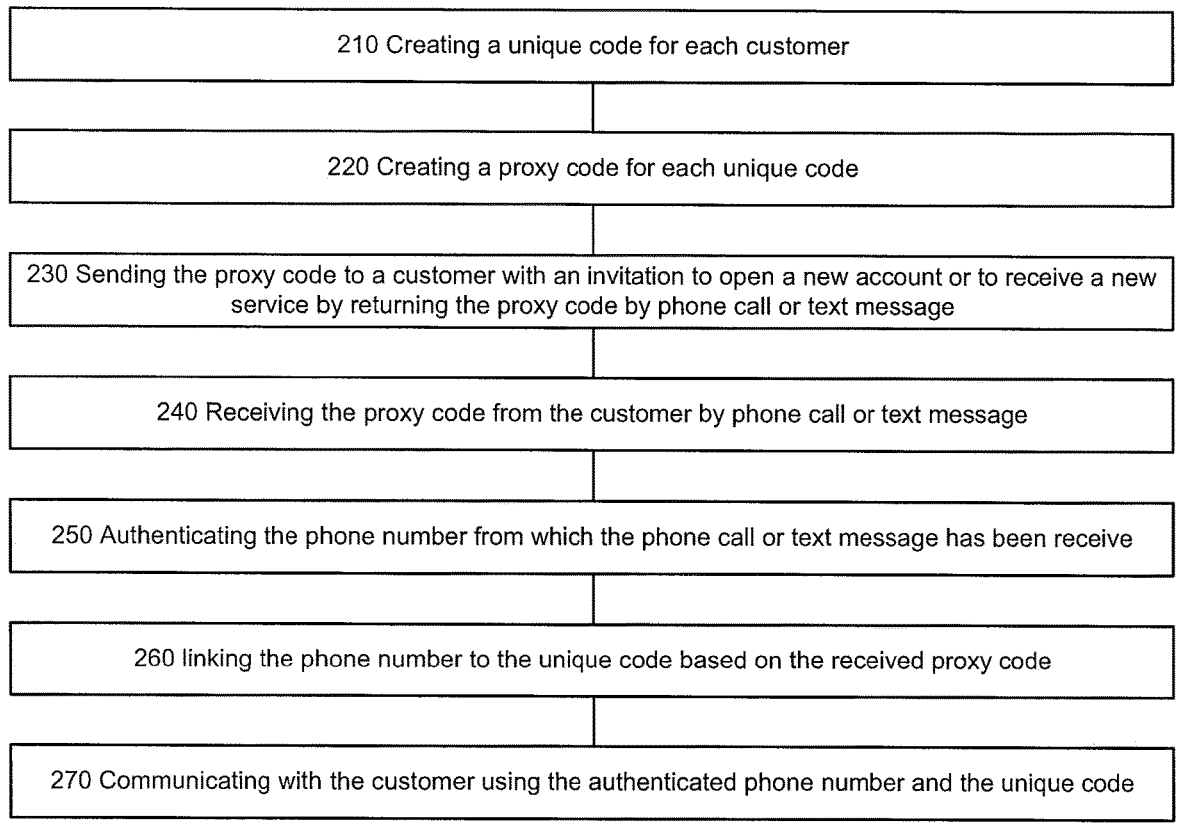
FIG. 2 illustrates an example embodiment of a method for passively acquiring a customer's phone number and linking the customer's phone number to the customer's account without requesting the customer to actively provide customer identifying information.

FIG. 2 illustrates an example embodiment of a method for passively acquiring a customer's phone number and linking the customer's phone number to the customer's account without requesting the customer to actively provide customer identifying information. This may be done, for example, to passively acquire the phone number of a customer when the customer activates a new account, such as a credit card, or a new service, such as electronic billing.

As shown in FIG. 2, at 210, a unique code may be created for each customer. For example, a unique code may be created for each customer that belongs to a business, such as a utility company. In one example embodiment, the unique code may be an account identifier, such as an account number, a credit number, an alphanumeric code, or the like.

In another example embodiment, the unique code may be an arbitrary code that would allow the business to identify a customer, but would not allow any other entity or person to identify the customer.

In creating the unique code for a customer, information regarding the customer may first be analyzed in order to determine a number of fields that may be used to create the unique code. For example, the customer information may be analyzed to determine the fields that are most likely to contain unique information. By using fields that contain unique information, it may be possible to increase the likelihood that the generated codes are also unique. For example, a unique code may be generated using a unique identifier such as a Social Security number. In another example embodiment, the customer information may be analyzed to determine which fields contain valid information. This may be done to, for example, reduce the likelihood that errors within data fields may influence the unique code that may be generated based on those fields. In yet another example embodiment, one or more fields may be selected from the customer information according to the source that customer information was derived from. For example, an account number may be selected from the customer information when the customer information is retrieved from a bank.

When one or more fields from the customer information have been determined, the unique code maybe generated using any number of fingerprinting algorithms known in the art. For example, the unique code may be generated using Rabin's fingerprinting algorithm, a cryptographic hash function, a hash function, a checksum, a digital signature, or the like. This may be done to, for example, uniquely identify information, such as electronic contact information for the customer, while keeping the data anonymous. Additionally, the fingerprint may permit the information to be used without removing the information from its location at the data source. For example, the unique code may be linked to the customer information such that the unique code may be used to reference the information and may permit the information to be used without moving the information from its location. In keeping the information at its original location, privacy concerns and/or policies may be alleviated.

At 220, a proxy code may be created for each unique code. This may be may be done, for example, to enable a customer to activate a new account and/or a new service by transmitting the proxy code to relay communication platform 140 by phone call or text message. The proxy code may be a code that allows information to be uniquely identified while keeping the data anonymous. The proxy code may be created in any manner described above. For example, the proxy code may be a code generated based on a fingerprinting algorithm that may allow the customer to activate a new account and/or a new service without revealing the identity of the customer.

At 230, the proxy code may be sent to a customer with an invitation to open a new account, receive a new service, or renew a service by returning the proxy code by phone call or text message. For example, the invitation may be an invitation to open a new account, receive a new service, or renew a service by texting the proxy code to a specified phone number and/or email address. The new account may be a bank account, a credit card account, a cable television account, an electric utility account, or the like. The new service may be electronic billing, a mail hold, a pay-per-view event, or the like.

In one example embodiment, the proxy code may be printed on the invitation. For example, a credit card offer may be mailed to a customer and may include a proxy code that the customer may use to activate the credit card. When the customer receives the credit card offer, the customer may active the credit card by texting the proxy code to the number specified by the credit card offer.

In another example embodiment, the proxy code may comprise a generic code for a particular group of customers of a particular marketing campaign and a variable number that is unique to a particular customer. For example, a group of customers may receive an invitation to receive a new service, such as electronic billing. The invitation may allow the customers to receive electronic billing by transmitting a proxy code to a specified number. The proxy code may be made up of a generic code printed on the invitation and a variable number. The variable number may be a number unique to each customer, such as a partial credit card number, a partial bank account number, a particle social security number, a pin number, or the like. To receive electronic billing, the customers may combine the generic code their variable code. For example, a customer may combine the generic code with the last four digitals of her account number and transmit the resulting proxy code to the specified number.

In another example embodiment, pluralities of proxy codes are provided to a company or business for inclusion in a marketing campaign to existing customers. The marketing campaign may include an invitation to open a new account, receive a new service, or renew a service by returning a proxy code provided with the invitation by phone call or text message.

At 240, a proxy code may be received from the customer by phone call or text message. For example, the customer may call or text a number specified by an invitation. In calling or texting the specified number, the customer may also transmit the proxy code. The proxy code may then be received from the customer. Additionally, the phone number from which proxy code was received may be identified and recorded.

At 250, the phone number from which the phone call or text message has been received may be authenticated. This may be done, for example, to determine whether the phone number identified as having transmitted the proxy code belongs to or is associated with the customer.

In one example embodiment, the identified phone number may be authenticated by using the proxy code to retrieve information regarding the customer from a plurality of sources. For example, the proxy code may be used to determine the unique code associated with the customer's account. The unique code and/or information from the customer's account may be used to gather information regarding the customer from one or more sources, such as a motor vehicle database, a cell phone provider database, a cable provider database, a utility provider database or the like. The customer information may then be analyzed to determine one or more phone numbers associated with the customer. The one or more determined phone numbers may then be compared to the identified phone number; the phone number from which a phone call or a text message has been received. When the identified phone number matches at least one or more determined phone numbers, the identified phone number may be authenticated as belonging to or being associated with customer. When the identified phone number does not match at least one or more determined phone numbers, a message may be text to the customer that instructs the customer to call a customer service phone number to open the new account or receive the new service.

In another example embodiment, the identified phone number may be authenticated by matching the identified phone number to a phone number that may be included in a plurality of sources. When a match for the identified phone number has been discovered, one or more individuals associated with the phone number may be identified. The proxy code may then be used to retrieve a unique code and/or information regarding the customer. The customer information and/or the unique code may then be used to match customer to the one or more individuals associated with the phone number and may authenticate the identified phone number when a match is discovered.

At 260, the identified phone number may be linked to the unique code based on the received proxy code. This may be done, for example, to provide a company or business with a unique code and/or an authenticated phone number for use in future communications with the corresponding customer. Additionally, this may be done to, for example, permit information for the customer from one source, such as a utility company, to be to be an anonymously linked to information for the customer in another source, such as a cell phone company. By linking information, the unique codes may be used to deliver electronic communication to the customer while keeping all information, such as the phone number for the customer, anonymous at all times. Additionally, the unique codes may enable the information to be used while permitting the information to remain at its original location. For example, a unique code may be assigned to a cell phone number and may be used by a business to send an electronic communication to a customer without moving the cell phone number from the source at which it is located.

At 270, communication with the customer may occur using the authenticated phone number and the unique code. For example, a business may use the unique code to transmit a text message to the customer, as the unique code is associated with the authenticated phone number. Moreover, the unique codes may be used as an identifier of the customer and may be used to communicate with the customer on behalf of a business or company without providing the customer's phone number to the business or company.

Figure 3:
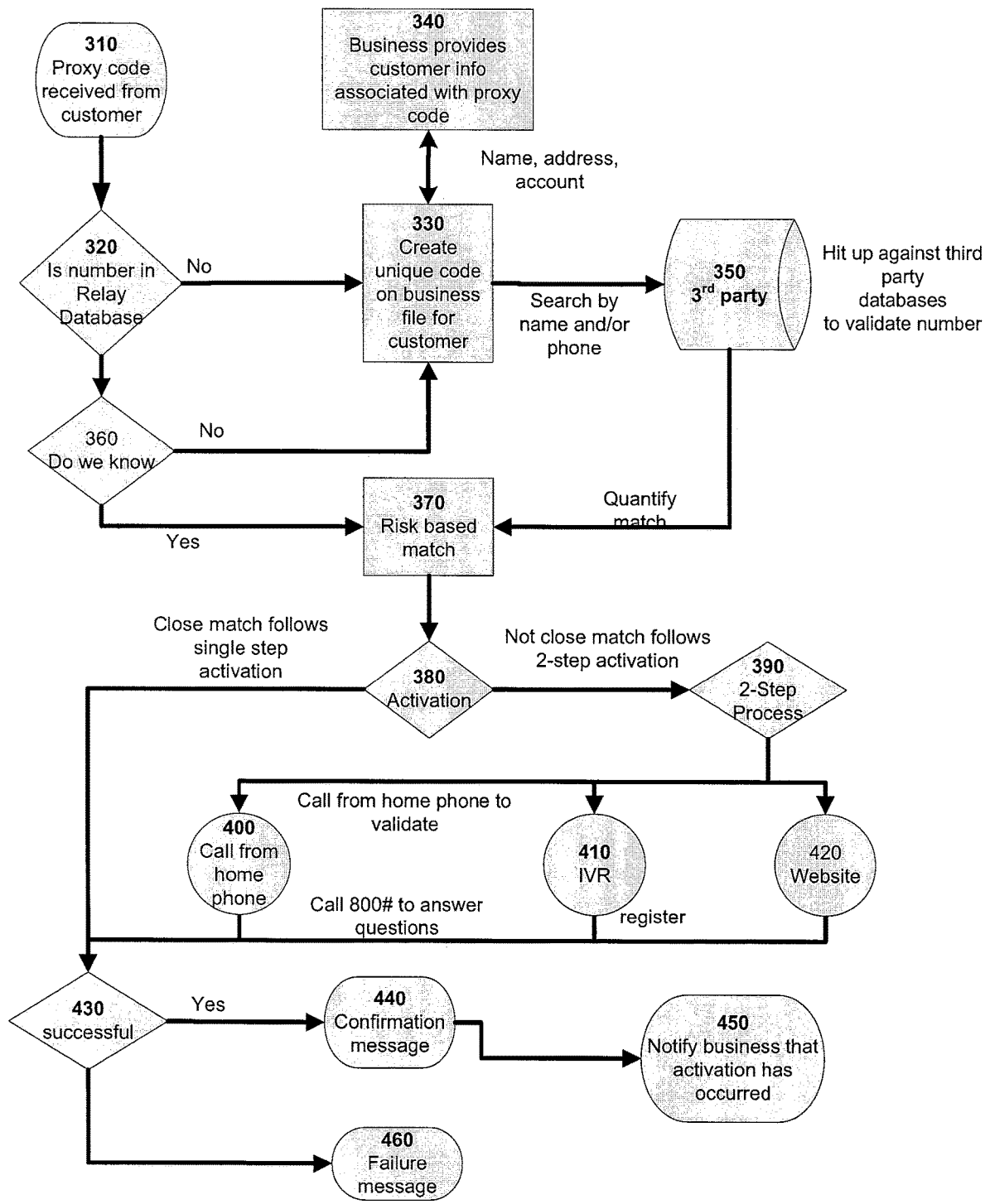
FIG. 3 illustrates another example embodiment of a method for passively acquiring a customer's phone number and linking the customer's phone number to the customer's account without requesting the customer to actively provide customer identifying information.

FIG. 3 illustrates another example embodiment of a method for passively acquiring a customer's phone number and linking the customer's phone number to the customer's account without requesting the customer to actively provide customer identifying information. This may be done, for example, to passively acquire the phone number of a customer when the customer activates a new account, such as a credit card, or a new service, such as electronic billing.

At 310, a proxy code may be received from the customer by phone call or text message. For example, the customer may call or text a number specified by an invitation included with a proxy code. In calling or texting the specified number, the customer may also transmit the proxy code. The proxy code may then be received from the customer. Additionally, the phone number from which proxy code was received may be identified and recorded.

At 320, the identified phone number from which the proxy code was received may be authenticated by matching the identified phone number to a phone number that may be included in a relay database. The relay database may be a database that includes customer information and/or unique codes form a plurality of sources. For example, the relay database may be a database that contains unique codes that may be linked to customer information such that the unique codes may be used to reference the information and may permit the information to be used without moving the information from its location. In keeping the information at its original location, privacy concerns and/or policies may be alleviated.

In one example embodiment, at 330, a unique code may be created for a customer and may be linked to a business file for a customer when the identified phone number cannot be authenticated. In creating the unique code for a customer, information regarding the customer may first be analyzed at 340 in order to determine a number of fields that may be used to create the unique code. For example, the customer information may be analyzed to determine the fields that are most likely to contain unique information. By using fields that contain unique information, it may be possible to increase the likelihood that the generated codes are also unique. For example, a unique code may be generated using a unique identifier such as a Social Security number. In another example embodiment, the customer information may be analyzed to determine which fields contain valid information. This may be done to, for example, reduce the likelihood that errors within data fields may influence the unique code that is generated based on those fields. In yet another example embodiment, one or more fields may be selected from the customer information according to the source that customer information was derived from. For example, an account number may be selected from the customer information when the customer information is retrieved from a bank.

When one or more fields from the customer information have been determined, the unique code maybe generated at 330 using any number of fingerprinting algorithms known in the art. For example, the unique code may be generated using Rabin's fingerprinting algorithm, a cryptographic hash function, a hash function, a checksum, a digital signature, or the like. This may be done to, for example, uniquely identify information, such as electronic contact information for the customer, while keeping the data anonymous. Additionally, the fingerprint may permit the information to be used without removing the information from its location at the data source. For example, the unique code may be linked to the customer information such that the unique code may be used to reference the information and may permit the information to be used without moving the information from its location. In keeping the information at its original location, privacy concerns and/or policies may be alleviated.

At 350, after a unique code is generated for the customer, the unique code may be linked to a business file, and additional information regarding the customer may be searched for in a third party database. For example, the third party database may be searched in order to determine one or more phone numbers associated with the customer. The one or more determined phone numbers may then be compared to the identified phone number; the phone number from which a phone call or a text message has been received. When the identified phone number matches at least one or more determined phone numbers, the identified phone number may be authenticated. When the phone number has been authenticated, a risk based match may be performed at 370 to determine whether the authenticated phone number, the unique code, and the correlating customer information are similar above a similarity threshold.

At 360, when the identified phone number has been authenticated, the relay database may be searched to determine whether the customer has a unique code. This may be done, for example, to retrieve information from a plurality of sources that may correspond to the customer. The retrieved information may then be compared to the customer information to determine whether the customer is known to the relay database or whether the customer has a unique code. When a unique code for the customer cannot be identified, as described above, a unique code may be created for the customer at 330.

At 370, a risk based match may be performed to determine whether the authenticated phone number, the unique code, and the correlating customer information are similar above a similarity threshold. This may be done, for example, to ensure that the authenticated phone number, the unique code, and the correlating customer information all relate to the customer. For example, a unique code assigned to a cell phone number and an email address found within a third party database may be similar to the unique code for the customer. To determine whether the cell phone number and email address belong to the customer, the unique code assigned to the cell phone number and the email address may be compared to the unique code for the customer. When the unique codes match above a similarity threshold, then the cell phone number and the email address may be considered as belonging to the customer. For example, the similarity threshold may be a requirement that codes are 95% similar. In one example embodiment, the similarity threshold may be generated by any statistical analysis algorithm known in the art. For example, the statistical threshold may be generated by a cluster analysis, principal component analysis, sparse principal component analysis, factor analysis, multivariate Gaussian distribution, or the like. In another example embodiment, a similarity threshold may be retrieved that had been previously generated.

At 380, a new account or a new service may be activated when the authenticated phone number, the unique code, and the correlating customer information meet or exceed the similarity threshold. For example, a new credit card account for the customer may be activated when the customer has been identified and the phone number of the customer has been authenticated. When the authenticated phone number, the unique code, and the correlating customer information do not meet or exceed the similarity threshold, the customer may be required to follow a two step activation process at 390.

At 390, the customer is notified that activation has failed and that the customer may activate the new account or service by selecting a different activation method. For example, the customer may choose to activate the new account or service by calling from a home phone at 400, calling an interactive voice response system (IVR) at 410, or visiting an activation website at 420. Upon following the selected activation method, the customer may activate the new account or service.

At 430, a determination is made as to whether activation has been successful. When activation has been successful, at 440, a confirmation message may be sent to the customer. For example, a text message may be transmitted to customer. Additionally, the business may be notified that the customer has activated a new account or service. When activation has not been successful, at 460, a failure message may be sent to the customer.

Those skilled in the art also will readily appreciate that many additional modifications are possible in the exemplary embodiment without materially departing from the novel teachings and advantages of the invention. For example, the system described herein may be used to supplement the contact information for customers of a business where the customers are, of course, known to the business. This may be done to, for example, allow a utility company to enroll its customers into an electronic billing system without requiring the utility company customers to provide electronic contact information. In one example embodiment, the utility company may have a database that includes physical addresses, account numbers, and names for its customers; however, the utility company does not have any electronic contact information for its customers. On the other hand, a cell phone company may have a server that includes the electronic contact information for the customers of the utility company. Due to privacy concerns, the electronic contact information must be kept anonymous and may not be removed from the server that belongs to the cell phone company. To alleviate the privacy concerns, the exemplary embodiment may analyze the contact information on the server belonging to the cell phone company and generate codes that may link to the electronic information. The codes may then be associated with created address profiles such that the electronic information may remain anonymous and at the server belonging to the cell phone company. The created address profiles may then be used by the utility company to send its customers a text message asking them if they would like to receive electronic bills on their cell phone. For example, the exemplary embodiment may match the created address profiles by analyzing the database of the utility company. In analyzing the database of the utility company, the exemplary embodiment may use the physical addresses, the account numbers, and the names to generate codes. These codes may then be used to search for the created address profiles associated with the cell phone company. When the created address profiles have been found, the codes within the created address profiles may be used to reference the electronic contact information within the cell phone company server. Using the references to the electronic contact information the exemplary embodiment may send text messages to the utility company customers asking the customers if they would like to receive electronic bills on their cell phone. Additionally, the utility company may transmit electronic bills to the customers' cell phones.

What is claimed:

1. A method of passively acquiring an existing customer's mobile phone number and linking the existing customer's mobile phone number to the existing customer's account without requesting the existing customer to actively provide customer identifying information, comprising the steps of:
    creating a unique code for the existing customer;
    creating a proxy code for said unique code;
    sending the proxy code to the existing customer with an invitation to open a new account, receive a new service, or renew a service and soliciting a response to the invitation by returning the proxy code by phone call or text message;
    receiving the proxy code from the existing customer by phone call or text message from the existing customer's mobile phone;
    a processor using the received proxy code to retrieve information regarding the existing customer from a database and comparing the phone number from which the phone call or text message has been received against phone numbers in the information in the database to authenticate the existing customer from which the proxy code has been received; and
    said processor linking the authenticated existing customer's mobile phone number from which the phone call or text message has been received to the unique code based on said proxy code to thereby identify the existing customer and link the existing customer's mobile phone number to the existing customer's account.

2. The method of claim 1, wherein the invitation is an invitation to open a new account, receive a new service, or renew a service by texting the proxy code to a specified number.

3. The method of claim 1, wherein when the phone number cannot be authenticated in said authenticating step, further comprising texting a phone number to the existing customer that the existing customer is to call to open the new account or receive the new service.

4. The method of claim 1, wherein the proxy code comprises a generic code for a particular group of existing customers of a particular marketing campaign and a variable number that is unique to a particular customer's invitation.

5. The method of claim 4, wherein the invitation comprises an invitation to open a new credit card account, the generic code comprises a promotional campaign number, and the variable number includes a portion of the credit card account number.

6. The method of claim 1, wherein the invitation comprises an invitation to open a new account, receive a new service, or renew a service and the proxy code is printed on the invitation.

7. A method of passively acquiring mobile phone numbers of existing customers of a company and linking the existing customers' mobile phone numbers to the existing customers' accounts without requesting the existing customers to actively provide customer identifying information, comprising the steps of:
providing a plurality of proxy codes to the company for inclusion in a marketing campaign to the existing customers, said marketing campaign including an invitation to open a new account, receive a new service, or renew a service and a solicitation to respond to the invitation by returning a proxy code provided with the invitation by phone call or text message;
receiving the proxy code from an existing customer by phone call or text message from the existing customer's mobile phone;
a processor using the received proxy code to retrieve information regarding the existing customer from a database and comparing the phone number from which the phone call or text message has been received against phone numbers in the information in the database to authenticate the existing customer from which the proxy code has been received;
creating a unique code for each proxy code with a corresponding authenticated phone number; and
the processor linking the unique code to the authenticated phone number to thereby identify the existing customer.

8. The method of claim 7, further comprising:
providing the unique code to the company with the corresponding authenticated phone number for use in future communications with the corresponding existing customer.

9. The method of claim 7, further comprising:
communicating with the existing customer using the authenticated phone number and the unique code.

10. The method of claim 7, further comprising:
communicating with the existing customer on behalf of the company without providing the existing customer's phone number to the company by using said unique code as an identifier of the existing customer.

11. The method of claim 7, wherein the invitation is an invitation to open a new account, receive a new service, or renew a service by texting a proxy code on the invitation to a specified number.

12. The method of claim 7, wherein when the phone number from which the phone call or text message has been received cannot be authenticated in said authenticating step, further comprising texting a phone number to the existing customer that the existing customer is to call to open the new account or receive the new service.

13. The method of claim 7, wherein the proxy code comprises a generic code for the marketing campaign and a variable number that is unique to a particular existing customer's invitation.

14. The method of claim 13, wherein the generic code comprises a promotional campaign number, and the variable number includes a portion of the credit card account number.

15. The method of claim 7, wherein the invitation comprises an invitation to open a new account, receive a new service, or renew a service and the proxy code is printed on the invitation.

16. A system for passively acquiring an existing customer's mobile phone number and linking the existing customer's mobile phone number to the existing customer's account without requesting the existing customer to actively provide customer identifying information, comprising:
a memory that stores computer executable instructions;
a processor that processes the computer executable instructions to perform the steps of:
creating a unique code for the existing customer;
creating a proxy code for said unique code;
sending the proxy code to the existing customer with an invitation to open a new account, receive a new service, or renew a service and soliciting a response to the invitation by returning the proxy code by phone call or text message;
receiving the proxy code from the existing customer by phone call or text message from the existing customer's mobile phone;
using the received proxy code to retrieve information regarding the existing customer from a database and comparing the phone number from which the phone call or text message has been received against phone numbers in the information in the database to authenticate the existing customer from which the proxy code has been received; and
linking the authenticated existing customer's mobile phone number from which the phone call or text message has been received to the unique code based on said proxy code to thereby identify the existing customer and linking the existing customer's mobile phone number to the existing customer's account.

17. The system of claim 16, wherein the invitation is an invitation to open a new account, receive a new service, or renew a service by texting the proxy code to a specified number.

18. The system of claim 16, wherein when the phone number cannot be authenticated, the processor further executing computer executable instructions for texting a phone number to the existing customer that the existing customer is to call to open the new account or receive the new service.

19. The system of claim 16, wherein the proxy code comprises a generic code for a particular group of existing customers of a particular marketing campaign and a variable number that is unique to a particular customer's invitation.

20. The system of claim 19, wherein the invitation comprises an invitation to open a new credit card account, the generic code comprises a promotional campaign number, and the variable number includes a portion of the credit card account number.

21. The system of claim 16, wherein the invitation comprises an invitation to open a new account, receive a new service, or renew a service and the proxy code is printed on the invitation.

22. A system for passively acquiring mobile phone numbers of existing customers of a company and linking the existing customers' mobile phone numbers to the existing customers' accounts without requesting the existing customers to actively provide customer identifying information, comprising:
 a memory that stores computer executable instructions;
 a processor that processes the computer executable instructions to perform the steps of:
  providing a plurality of proxy codes to the company for inclusion in a marketing campaign to the existing customers, said marketing campaign including an invitation to open a new account, receive a new service, or renew a service and a solicitation to respond to the invitation by returning a proxy code provided with the invitation by phone call or text message;
  receiving the proxy code from an existing customer by phone call or text message from the existing customer's mobile phone;
  using the received proxy code to retrieve information regarding the existing customer from a database and comparing the phone number from which the phone call or text message has been received against phone numbers in the information in the database to authenticate the existing customer from which the proxy code has been received;
  creating a unique code for each proxy code with corresponding authenticated phone number; and
  linking the unique code to the authenticated phone number to thereby identify the existing customer.

23. The system of claim 22, wherein the processor further executes computer executable instructions for providing the unique code to the company with the corresponding authenticated phone number for use in future communications with the corresponding existing customer.

24. The system of claim 22, wherein the processor further executes computer executable instructions for communicating with the existing customer using the authenticated phone number and the unique code.

25. The system of claim 22, wherein the processor further executes computer executable instructions for communicating with the existing customer on behalf of the company without providing the existing customer's phone number to the company by using said unique code as an identifier of the existing customer.

26. The system of claim 22, wherein the invitation is an invitation to open a new account, receive a new service, or renew a service by texting a proxy code on the invitation to a specified number.

27. The system of claim 22, wherein when the phone number from which the phone call or text message has been received cannot be authenticated, the processor further executing computer executable instructions for texting a phone number to the existing customer that the existing customer is to call to open the new account or receive the new service.

28. The system of claim 22, wherein the proxy code comprises a generic code for the marketing campaign and a variable number that is unique to a particular existing customer's invitation.

29. The system of claim 28, wherein the invitation comprises an invitation to open a new credit card account, the generic code comprises a promotional campaign number, and the variable number includes a portion of the credit card account number.

30. The system of claim 22, wherein the invitation comprises an invitation to open a new account, receive a new service, or renew a service and the proxy code is printed on the invitation.

* * * * *